Feb. 14, 1950
L. G. ERICKSON
2,497,592
CARRIER TERMINAL EQUIPMENT
Filed Nov. 13, 1947
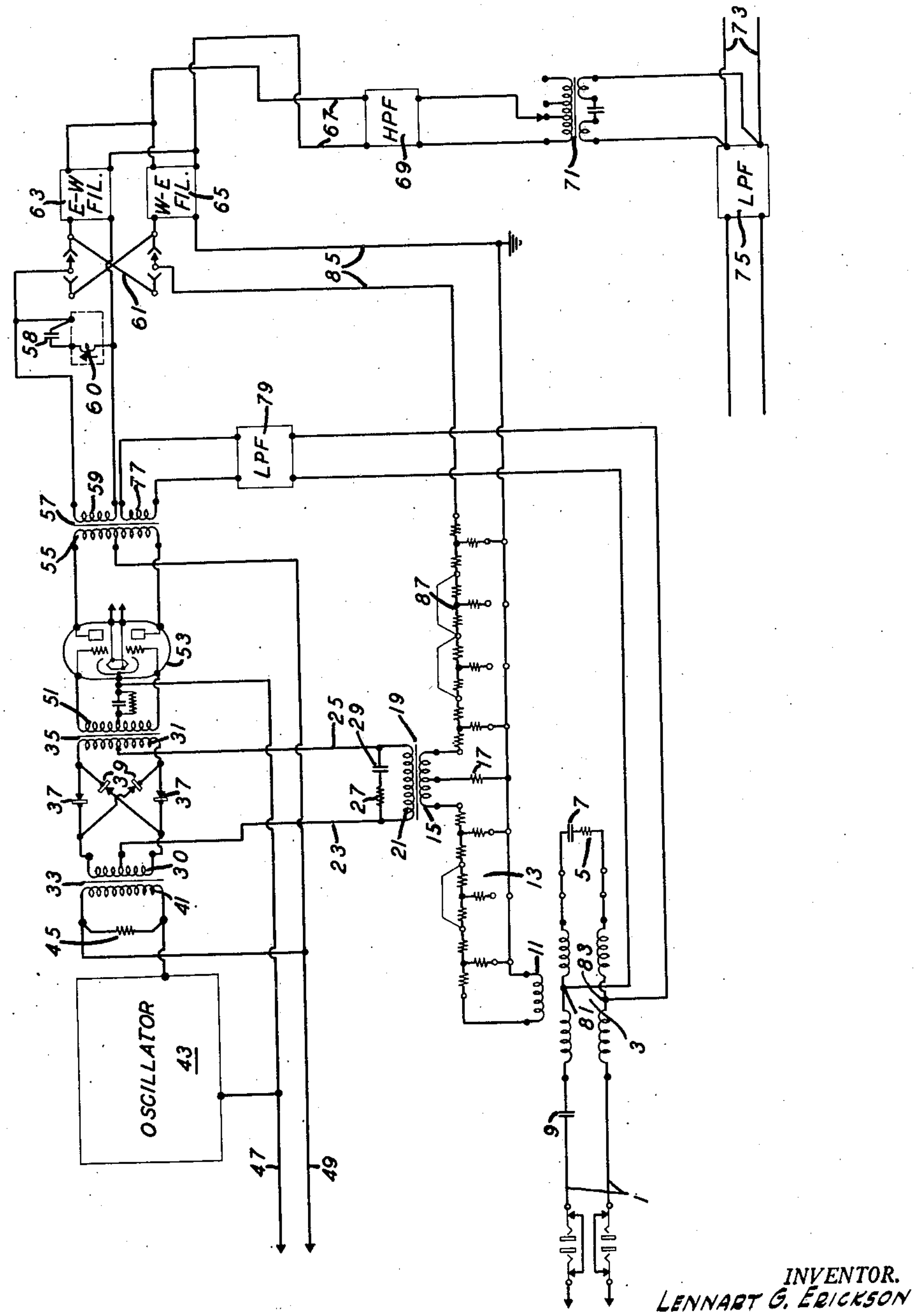
INVENTOR.
LENNART G. ERICKSON
BY Donald K. Lippincott
HIS ATTORNEY Patented Feb. 14, 1950 2,497,592

UNITED STATES PATENT OFFICE 2,497,592

CARRIER TERMINAL EQUIPMENT

Lennart G. Erickson, San Francisco, Calif.

Application November 13, 1947, Serial No. 785,591

5 Claims. (Cl. 179—2.5)

This invention relates to carrier terminal equipment, that is, equipment for connecting between a low frequency line, which carries other telegraph currents or voice frequency telephone currents, and a carrier frequency line, and effecting the necessary frequency conversions for conducting two-way conversations between such lines.

The broad purpose of this invention is to provide a carrier current communication system having maximum economy, not only in initial cost, but also, through having maximum reliability, maximum economy in maintenance and repair. To this end, one of the objects of my invention is to provide a system wherein the elements thereof are so far as possible used for the dual purpose of modulation and demodulation of the carrier current; to provide a system where a minimum number of vacuum tubes is used; to provide a system wherein the same circuits are used for modulation and demodulation; and to provide a system which is stable in operation and will not "sing" under normal conditions of operation.

It is conventional practice in carrier current communication to generate a constant frequency carrier current and amplitude-modulate this with the voice or other relatively low frequency signal which is to be transmitted, thus producing currents of the new "side-band" frequencies $(f_c+f_s)$ and $(f_c-f_s)$, where $f_c$ is the carrier frequency and $f_s$ the original signal frequency; to filter out of the mixed frequencies in the modulator output all except one of the side-band frequencies and to transmit this as the new signal on the "carrier frequency line," which usually carries other signals at low frequency, other carrier frequencies or both. It is also conventional to recover the original signal at the receiving end of the carrier frequency line by an identical process, modulating the side-band frequency upon the same carrier frequency, in which case the new "lower side-band" is the frequency of the original signal.

Since it is extremely difficult to maintain the oscillators at receiving and sending ends of the line exactly in synchronism, and since in simple modulators both the frequencies $f_c$ and $f_s$ appear in the output, and if the original carrier were transmitted it would produce an annoying spurious frequency or "beat note" at the receiving end, it is customary to employ a balanced modulator, wherein the frequency $f_c$ is suppressed in the output circuit, and various types of such balanced modulators have been developed and are well known in the art, which are capable of balancing out the carrier frequency with great precision.

In the past it has been usual to employ separate but identical equipment for the modulation and demodulation processes, often with a common oscillator to supply the carrier frequency $f_c$ for both. The necessity for this arises owing to the presence of the modulating frequency in the output of the modulator, and owing to the nature of the circuits which have been employed this modulating frequency would, if common equipment were employed for both modulation and demodulation, feed back to the input and cause oscillation or "singing" at some frequency within either the original signal frequency band or within a side-band.

Amplitude modulation is essentially the process of multiplying the instantaneous values of currents of two frequencies. Accordingly it is just as proper to consider the carrier frequency as modulated upon the signal frequency as is the more usual reverse concept, and it follows that a balanced modulator can equally well be used to suppress the "modulating" frequency as to suppress the carrier.

In accordance with my invention any conventional type of balanced modulator is so used, the modulating frequency terminals being coupled to both the low frequency line and the carrier frequency line, the connection to the latter being through a "directional filter" which passes only the side-band used for the incoming signals therefrom. The output circuit of the modulator is also coupled to both lines; to the low frequency line through a low-pass filter, and to the carrier frequency line through a second directional filter which passes only the side-band used for outgoing carrier signals. The coupling of the low frequency line to the input and output circuits of the modulator is through a hybrid transformer or other bridge circuit which is balanced with respect to the input and output modulator circuits so that transfer between the latter is minimized, and any of the modulating frequency which may, due to lack of perfect balance, appear in the modulator output is still further attenuated and the loop gain reduced so that the modulator does not tend to oscillate.

The nature of the invention can best be understood by reference to the ensuing description and the accompanying drawing, the single figure of which is a circuit diagram of a preferred form of the invention.

Referring to the drawing, the line 1 represents the low frequency line, connecting, usually, to a telephone switchboard or such telegraph apparatus as may be used in connection with the carrier circuit. The line terminates in a bridge circuit, which is conveniently a conventional hybrid transformer 3, which in turn is connected to a balancing network, in this instance comprising a resistor 5 and series condenser 7. A condenser 9 is frequently included in circuit with the hybrid transformer, to block the passage of direct currents which may be used in the switchboard.

The secondary or output winding of the hybrid transformer 11 connects to a loop circuit, one side of which includes first, a transmitting pad 13, which is usually permanently adjusted to attenuate the signals from the switchboard to the proper level for modulation, and thence through one side of a center-tapped transformer primary 15 through a terminating resistance 17, and so back to the secondary 11. The impedance of the resistance 17 is so chosen that it absorbs half of the energy delivered by the coil 11. The other side of the loop will be described later.

The transformer 19, which carries the primary coil 15 before mentioned, is designed to pass a broad band of frequencies, that is, not only the voice or other low frequency from the line 1, but also both side-bands of carrier frequency. The secondary coil 21 of this transformer feeds the modulator, through the lines 23 and 25. If any equalization of the frequencies is necessary, an equalizing circuit, such as the resistor 27 and condenser 29 is series, may be connected across these lines.

The modulator here chosen for illustration is of the well known "ring" type, but it is to be understood that other balanced modulators, including vacuum tube types, may be used instead. In the modulator shown the leads 23 and 25 connect respectively, to the carefully balanced center taps of the coils 30 and 31 of two transformers 33 and 35. Each end of the two transformer coils 30 and 31 is connected to both ends of the other through oppositely directed rectifiers 37 and 39 respectively. It will be seen that if the two coils are accurately balanced the currents arriving through leads 23 and 25 will split through the two halves, and no voltage will be generated across the ends of either of the transformer coils.

Carrier current is supplied to the modulator through a winding 41 on the transformer 33, from an oscillator 43, which, since it can be any of many well known types, is shown merely in block form. The coil 41 is bridged by a resistor 45, to match the impedance of the oscillator circuit, and give the required amplification, and the oscillator is fed with plate current from the leads 47 and 49 connecting to a power supply, not shown.

The output of the modulator is through a secondary coil 51 on the transformer 35. This is connected to a push-pull vacuum tube amplifier, which I prefer, for the sake of maintaining balance, to construct with a double tube 53. The two plates of this tube connect to the ends of a conventional push-pull transformer primary 55 on a transformer 57.

The transformer 57 is provided with two output coils. The carrier current component in the output of the modulator is suppressed by connecting a sharply series-resonant circuit across either one of the two output coils, but which I prefer to connect across the output of the coil 59. The circuit comprises a condenser 58 and an inductor 60, which together serve to short circuit the carrier frequency component. Secondary 59 connects to a double-pole double throw-switch 61, by means of which either one of two directional filters 63 or 65 may be connected in series with the output. Both of these filters connect through the line 67, and a high-pass filter 69, to a matching transformer 71 which connects with the carrier frequency line 73. In accordance with usual practice, each of the directional filters passes but one side-band of the carrier current, while the line filter 69 carries both of the side-bands. A low-pass filter 75 enables voice or other low frequency currents also to be passed on to the same line from a source unrelated to the carrier equipment.

The second output coil 77 on the transformer 57 connects through a low-pass filter 79 to the balanced terminals 81 and 83 on the hybrid coil 3.

The double throw-switch 61, which serves to connect one of the filters 63 or 65 to the output of the modulator, also serves to connect the other filter to a line 85 which leads, through a pad 87, to the opposite end of the transformer primary 15 from that which connects to the coil 11 and to the terminal of the resistor 17. The impedance of the modulator is matched to the impedance of the resistor 17, so that the transformer 19 acts as a differential transformer, and voltages appearing across the hybrid coil secondary 11 do not appear across the filters 63 or 65, and similarly, voltages from the line through the two filters mentioned do not appear across the hybrid coil secondary 11.

The operation of the device should be fairly clear from the foregoing. Considered as a modulator, the low frequency signal arrives from the line 1, and is transferred through the hybrid transformer 3 with its secondary 11 to one side of the transformer 19. This passes it on to the modulator, where it is stepped up to carrier frequency, and amplified by the tube 53. The modulating frequency is suppressed in the modulator, and the two side-bands and carrier are passed on through the transformer 57, to the series resonant circuit 58, 60, which short-circuits the carrier, and removes it sufficiently so that it causes no trouble in the carrier frequency line. The directional filter 63 or 65, removes one side-band and passes the other on to the carrier line through the high pass filter 69.

Carrier frequency currents arriving from the line 73 pass through the high-pass filter 69, the lead 67, and one of the two directional filters through the line 85 to the transformer 19, and thus to the modulator, which, in this instance, acts as a "demodulator" to step down the frequency to the voice or low frequency range. The low frequency component is passed through the low-pass filter 79 and back to the hybrid transformer 3.

The chief factor to be guarded against in equipment of the kind here described is instability or oscillation at some frequency within its range. The modulation is accompanied by amplification, and if some frequency which appears in the input of the modulator can, after amplification, be returned to that input, oscillation will take place. This is especially likely to occur at some frequency near the cut-off of the filters, especially if their pass-bands are closely adjacent. In the present equipment this is carefully guarded against by subjecting each frequency to at least two attenuations before it can possibly return to the input. Thus, the modulating frequency is balanced out in the modulator itself, but balancing is always the matter of approximation and some of this frequency will probably remain in the output of the modulator, although at very low level.

If we are considering the low or voice frequency modulation, this frequency can pass through the low-pass filters 79 and appear on the line 1, but in this connection it is balanced against the secondary 11, and again attenuated so that it has, to all intents and purposes, entirely disappeared and does not reappear in the input circuit of the modulator. In the case of a carrier frequency input, beside the modulator balance, it must pass through the opposite directional filter 63 or 65 in order to return to the modulator input, and in this filter it receives its second attenuation.

Again considering the low frequency, it is largely balanced out in the differential transformer 19 in the loop which connects the low and high frequency lines to the modulator input, but it is again subjected to attenuation in the directional filter and therefore does not appear in the carrier frequency line. In the case of the high frequency from the carrier line, it again is attenuated in the differential transformer 19, and is blocked from the low frequency line 1.

I have found that the system described is fully practical in practice. It saves two tubes in comparison with conventional equipment of equal capacity. This results not only in the saving of tubes but, more important, in the saving of power to supply these tubes, which becomes an important factor in large installations. It also saves the complete equipment of one modulator circuit, which results in initial economy. Furthermore tubes are the most perishable of all equipment used in carrier service, and are most subject to failure. By reducing the number to half the probability of such failures and the additional cost of maintenance which they entail is reduced in like proportion.

I claim:

1. Carrier terminal equipment for connecting between a low frequency line and a carrier frequency line comprising a balanced modulator, an input circuit for supplying modulating frequencies to said modulator and connected to balance out said modulating frequencies in the output circuit of said modulator, an oscillator connected to supply carrier frequency to said modulator, a hybrid transformer and matching network terminating said low frequency line, a loop circuit connecting with a secondary winding on said hybrid transformer and said carrier frequency line and coupled to said input circuit, a directional filter in said loop circuit, an output circuit for said modulator coupled to said carrier frequency line through a second directional transformer, and a second loop circuit including a low-pass filter also coupled to said output circuit and connected to the mid-points of the hybrid transformer coils.

2. Carrier terminal equipment for connecting between a low frequency line and a high frequency line comprising a hybrid transformer for connection to said low frequency line, a network to balance said low frequency line connected to said hybrid transformer, a broad band pass differential transformer connected to the output of said hybrid transformer by a loop circuit, a terminating resistor connected to the primary center tap of said differential transformer, a balanced ring modulator connected to the secondary of said differential transformer in such manner that the frequencies from said differential transformer are suppressed in the output of said modulator, a source of carrier frequency connected to said modulator, an amplifier connected to the output of said modulator, an output transformer having a dual output connected to the output of said modulator, a high frequency circuit adapted to be coupled to said high frequency line, a high pass filter capable of passing both side band frequencies of the modulated carrier frequency interposed in said high frequency circuit, a circuit connecting one output of said output transformer and said high frequency circuit, a high pass filter designed to pass only one side band of the modulated carrier frequency interposed between said output transformer and said high frequency circuit, a sharply series resonant circuit tuned to the carrier frequency bridged across the circuit between said output transformer and said high frequency line, a circuit connecting the other output of said output transformer and the primary of said hybrid transformer, the coupling thereof to said low frequency line being balanced with respect to the coupling of line to said modulating frequency circuit to minimize energy transfer between the two circuits, a low pass filter interposed between said output transformer and said hybrid transformer, a loop circuit connecting said high frequency circuit and the center tapped primary of said differential transformer, and a band pass filter designed to pass only the second side band of the modulated carrier frequency interposed in the circuit connecting said high frequency circuit and said differential transformer.

3. Carrier terminal equipment for connecting a low frequency line and a high frequency line comprising a broad band pass differential transformer, means for balancing the inputs to said differential transformer to minimize the transfer of energy therebetween, means for transferring signals from said low frequency line to the input of said differential transformer, a balanced modulator connected to the output of said differential transformer in such manner that the frequencies from said transformer are suppressed in the output of said modulator, a source of carrier frequency connected to said modulator, a high frequency circuit, means for coupling said high frequency circuit to said high frequency line, a high pass filter capable of passing both side bands of the modulated carrier frequency interposed in said high frequency circuit, a circuit connecting the output of said modulator to said high frequency circuit, a high pass filter designed to pass only one side band of the modulated carrier frequency interposed between said modulator and said high frequency circuit, a sharply series resonant circuit tuned to the carrier frequency bridged across the circuit connecting said modulator and said high frequency circuit, a circuit for coupling the output of said modulator to said low frequency line, a low pass filter interposed in the circuit between said modulator and said low frequency line, a circuit for connecting said high frequency line and the input of said differential transformer, and a high pass filter designed to pass only, the other side band of the modulated carrier frequency interposed between said high frequency line and said differential transformer.

4. Carrier terminal equipment for connecting between a low frequency line and a high frequency line comprising a balanced modulator, a source of carrier frequency connected to said modulator, a high frequency circuit adapted to be coupled to said high frequency line, a high pass filter capable of passing both side bands of the modulated carrier frequency interposed in said high frequency circuit, means for transferring modulating signal frequencies from both said low frequency line and said high frequency circuit and impressing said frequencies on said modulator in such manner that said modulating frequencies are suppressed in the output of said modulator, means for balancing the inputs to said modulator to minimize the transfer of energy therebetween, a high pass filter designed to pass only one side band of the modulated carrier frequency interposed between said high frequency circuit and the input to said modulator, means whereby the output of said modulator is directed into two channels, one of said channels being adapted to be coupled to said low frequency line and the other channel being connected to said high frequency circuit, a high pass filter designed to pass only the other side band of the modulated carrier frequency interposed between the output of said modulator and said high frequency circuit, a sharply series resonant circuit tuned to said carrier frequency bridged across the channel from the output of said modulator to said high frequency circuit, and a low pass filter interposed in the channel extending from the output of said modulator to said low frequency line.

5. Carrier terminal equipment for connection between a low frequency line and a carrier frequency line comprising a hybrid coil for connection to said low frequency line, a circuit from said hybrid transformer including one half of the primary coil of a differential transformer, a circuit from the other half of said primary coil for connection to said high frequency line, balancing means connecting said primary and said circuits to prevent energy transfer between said circuits, a modulator having two input circuits, one only of which is balanced with respect to the frequencies supplied thereto, a circuit connecting the secondary coil of said differential transformer to the balanced input circuit of said modulator, a source of carrier frequency current connected to the unbalanced input of said modulator, a plurality of output circuits fed by said modulator, one of said output circuits including a low pass filter and connected to said hybrid coil, the other of said output circuits including a filter adapted to pass one only of the high frequency side bands of said modulator output, means including a high-pass filter adapted to pass both side bands for connecting said second-mentioned output circuit to said high frequency line, a filter adapted to pass the other side band interposed in the circuit between said differential transformer and said high frequency line, and a circuit sharply series-resonant to said carrier frequency (as distinguished from said side bands) connected across one of said output circuits for effectively short-circuiting said carrier frequency.

LENNART G. ERICKSON.

REFERENCES CITED

The following references are of record in the file of this patent:

UNITED STATES PATENTS

| Number | Name | Date |
|---|---|---|
| 1,448,408 | Jammer | Mar. 13, 1923 |
| 1,449,372 | Arnold | Mar. 27, 1923 |
| 1,502,811 | Espenschied | July 29, 1924 |
| 1,556,321 | Espenschied | Oct. 6, 1925 |
| 1,581,576 | Horton | Apr. 20, 1926 |
| 1,620,629 | Black | Mar. 15, 1927 |